United States Patent [19]

Cook

[11] Patent Number: 5,436,897
[45] Date of Patent: Jul. 25, 1995

[54] MULTIPLEX WIRING SYSTEM USING VARYING DURATION PULSE WIDTH MODULATION

[75] Inventor: Roger J. Cook, Livonia, Mich.

[73] Assignee: Ford Motor Company, Dearborn, Mich.

[21] Appl. No.: 868,813

[22] Filed: Apr. 15, 1992

[51] Int. Cl.⁶ .............................................. H04J 3/00
[52] U.S. Cl. .................... 370/77; 340/825.07
[58] Field of Search ........... 340/825.07, 825.5, 825.51, 340/825.52, 825.63; 370/85.1, 85.7, 9, 77, 95.2, 95.3, 85.9; 328/111

[56] References Cited

U.S. PATENT DOCUMENTS

| | | | |
|---|---|---|---|
| 4,014,002 | 3/1977 | Tucker | 340/168 |
| 4,178,549 | 12/1979 | Ledenbach et al. | 325/38 |
| 4,571,589 | 2/1986 | Slocum et al. | 340/870.32 |
| 4,750,167 | 6/1988 | Meyer | 370/77 |
| 4,878,217 | 10/1989 | Nakamura et al. | 370/77 |
| 5,124,980 | 6/1992 | Maki | 370/77 |

FOREIGN PATENT DOCUMENTS

| | | |
|---|---|---|
| 0295897 | 12/1988 | European Pat. Off. . |
| 1152452 | 5/1969 | United Kingdom . |
| 2240865 | 8/1991 | United Kingdom . |

Primary Examiner—Douglas W. Olms
Assistant Examiner—Dang Ton
Attorney, Agent, or Firm—Richard D. Dixon; Roger L. May

[57] ABSTRACT

A method and apparatus is used in a motor vehicle to serially communicate data between two or more communication nodes coupled to a data bus. Each communication node receives and transmits information on the data bus. Signals representative of operation of the vehicle are received directly by nodes and encoded for transmission to one or more other nodes via the data bus. The signals, which may for example originally be in parallel format, are encoded into serial digital data for data bus transmission. Each bit of the serial digital data is formatted into subbits of unequal duration. A designated module then receives and decodes the serial digital data for information or control purposes. Preferably the subbits progressively increase in duration with one working embodiment having three subbits of seven (7), eight (8) and nine (9) microseconds, respectively, to define a bit time of twenty four (24) microseconds.

15 Claims, 2 Drawing Sheets

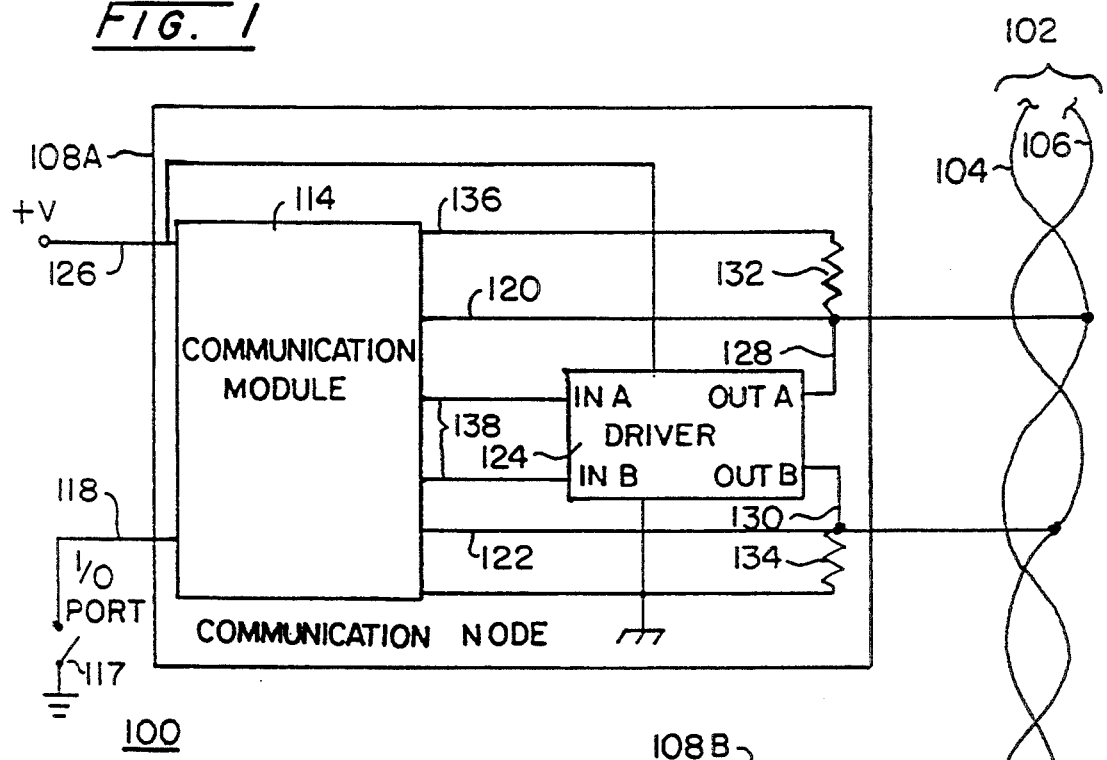
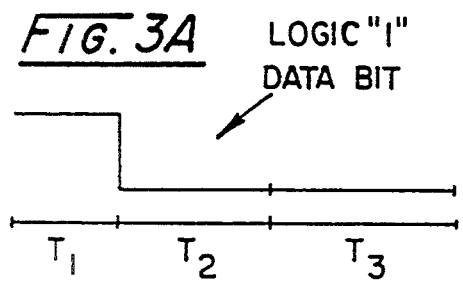
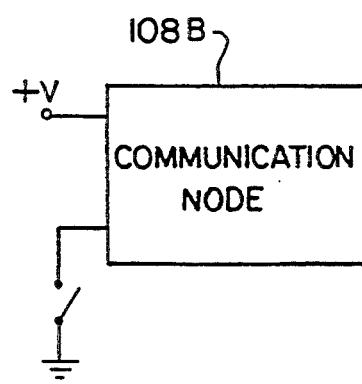
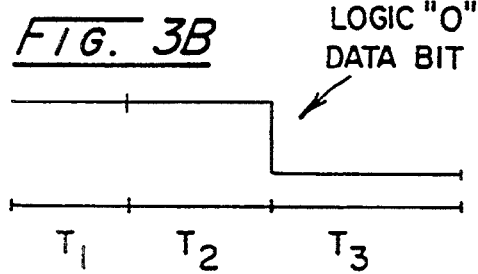
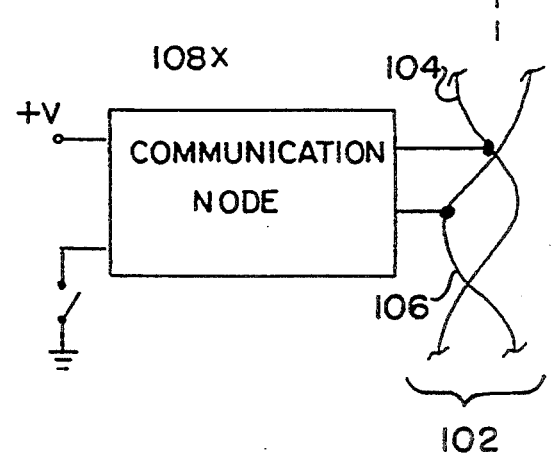

MULTIPLEX WIRING SYSTEM USING VARYING DURATION PULSE WIDTH MODULATION

BACKGROUND OF THE INVENTION

The present invention relates generally to multiplex wiring systems for use in motor vehicles and, more particularly, to a method and apparatus for formatting and transmitting data bits divided into subbits of unequal, preferably progressively increasing duration in a multiplex wiring system.

Multiplex wiring systems have been used in motor vehicles to provide communications over a reduced number of wires for a wide range of accessory control and computer communications applications. In such systems, a plurality of communication nodes, each capable of serially transmitting and receiving digital data, are coupled to a data bus, such as a twisted wire pair. The nodes convert signals received from local computers, sensors, transducers or the like into a format acceptable for transmission on the data bus. For example, a node may convert parallel data from a local computer or sensor into serial data. Conversely, serial data signals appearing on the data bus are transformed by a node into a format usable by the node.

The serial digital data generated by the nodes is generally formatted to sequentially include a start-of-message signal, an address for a particular receiving node, message data for performing an operation or conveying information regarding the current status of the node, and an end-of-message signal. Each communication node detects the start-of-message signal for actuating the appropriate receiving circuitry. However, only the designated receiving node recognizes its own address and then acts upon the instruction data following its address. An example of such a multiplex wiring system is disclosed in U.S. Pat. No. 3,651,454 issued to Venema et al.

Various data string formats have been used in the past to transfer information between communication modules. Commonly assigned U.S. Pat. No. 4,792,950 issued to Volk et al discloses a data signal which uses a pulse width modulated (PWM) format. In this PWM format, each data bit is divided into three subbits of equal duration. For example, a bit of twenty, four microseconds is comprised of three eight microsecond subbits. A logic zero (0) data bit is defined by two initial subbits at a high voltage level followed by one subbit at a low voltage level. Conversely, a logic one (1) data bit is comprised of one high voltage level subbit followed by two low voltage level subbits.

Using serial data transmission and known data string formats as opposed to parallel transmission reduces the number of wires needed for the data bus and reduces the number of line drivers, receivers and other line conditioning circuits required with corresponding cost reductions. Unfortunately, a reduction in the allowable data rate is also experienced since information is transmitted sequentially over the twisted wire pair instead of simultaneously over a plurality of parallel wires. The data rate is further limited by electromagnetic interference (EMI), capacitance within the system, component start-up delay and other physical limitations within the harsh motor vehicle environment.

Accordingly, there is a need for improved multiplex wiring systems and methods for transmitting data to provide for increased serial data transmission rates in motor vehicle applications.

SUMMARY OF THE INVENTION

This need is met by a method and apparatus in accordance with the present invention for use in a motor vehicle wherein data is serially communicated on a data bus coupled to two or more communication modules. Each communication module receives and transmits information on the data bus. Signals representative of operation of the vehicle are received by modules and encoded for transmission to one or more other modules via the data bus. The signals, which may for example originally be in parallel format, are encoded into serial digital data for data bus transmission. Each bit of the serial digital data is formatted into subbits of unequal duration. A designated module then receives and decodes the serial digital data for information or control purposes.

In accordance with one aspect of the present invention, one of at least two communication modules receives a signal representative of vehicle operations associated with the module. The module encodes the signal into digital data for serial transmission over a data bus, comprising preferably a twisted wire pair. The digital data comprises a plurality of bits with each bit being divided into a plurality of unequal duration subbits. The digital data is serially transmitted over the data bus to a second one of the communication modules which receives and decodes the data.

Complementary digital data may also be encoded and transmitted over the data bus by the communication module. The complementary digital data is similarly comprised of a plurality of bits which are divided into a plurality of unequal duration subbits. The complementary digital data is also received and decoded. Preferably, each succeeding subbit of each bit contained in the digital data and the complementary digital data are of progressively increasing duration. A bit may comprise first, second and third subbits of seven, eight and nine microseconds duration, respectively, for a bit duration of twenty four microseconds. The transmission rate of the digital data and the complementary digital data may be 41.667 kilobits per second.

It is thus a feature of the present invention to provide an improved multiplex wiring system and method for communicating data over a data bus in a motor vehicle at increased serial data transmission rates with each data bit divided into a plurality of subbits of unequal duration.

Other features and advantages of the present invention will be apparent from the following description, the accompanying drawings and the appended claims.

BRIEF DESCRIPTION OF THE DRAWINGS

FIG. 1 is a schematic block diagram of a multiplex wiring system operable in accordance with the present invention;

FIG. 3A is a graphic representation of a pulse width modulated logic one (1) data bit in accordance with the present invention; and FIG. 3B is a graphic representation of a pulse width modulated logic zero (0) data bit in accordance with the present invention.

DETAILED DESCRIPTION OF THE INVENTION

Figure 2:
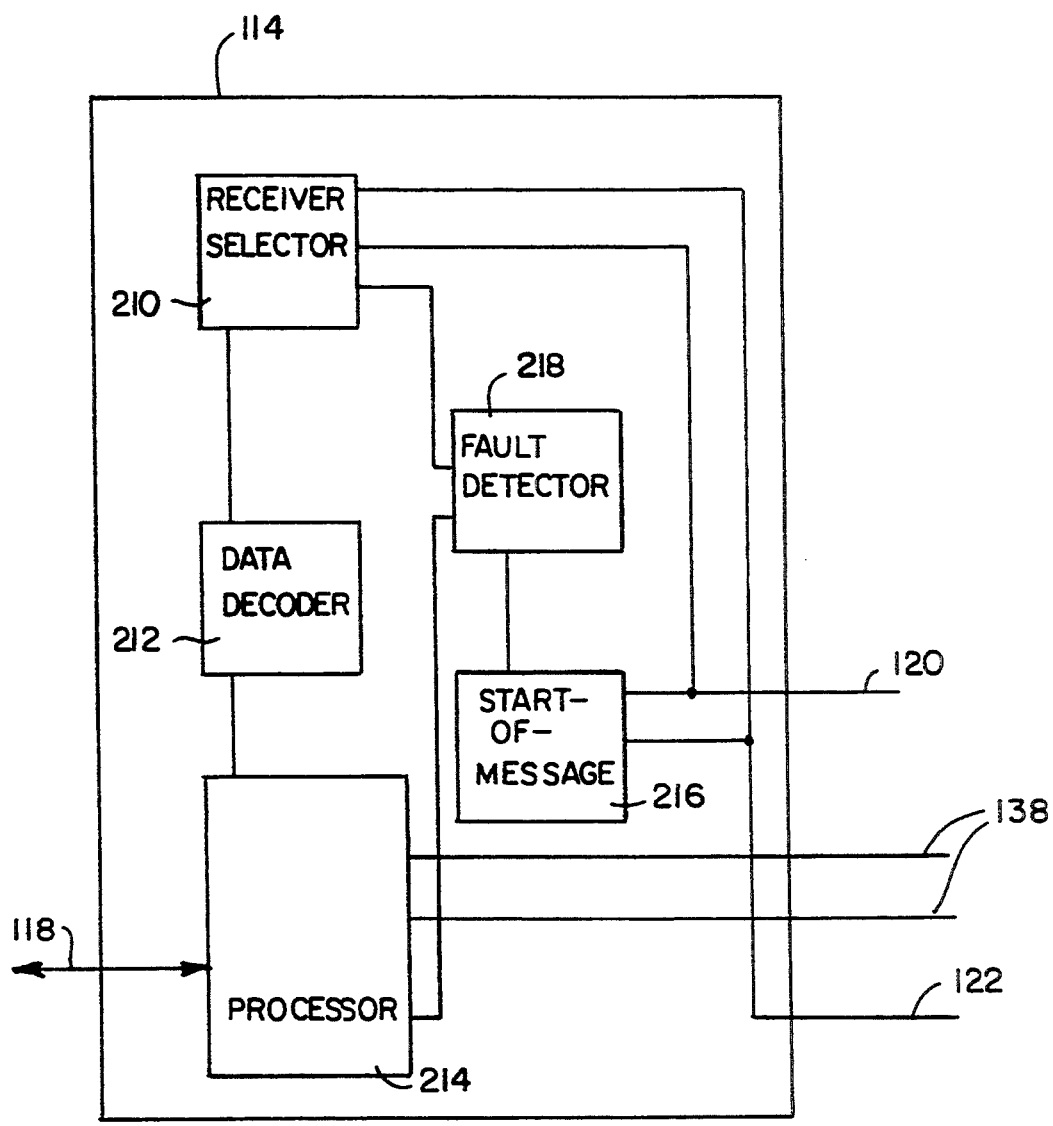
FIG. 2 is a schematic block diagram of a communication module of FIG. 1.

Reference is now made to the schematic block diagram of FIG. 1 which illustrates a multiplex wiring system 100 operable in accordance with the present invention. A twisted wire pair 102, consisting of information bus lines 104, 106, makes up the data bus for the system 100 and thus interconnect communication nodes 108A through 108X. Typical configurations of the multiplex wiring system 100 include from two to thirty two identical communication nodes which communicate over the bus lines 104, 106.

For ease of description and since all communication nodes are the same in the illustrated embodiment, only the operation of the communication node 108A will be described herein. Communication nodes 108A through 108X of the system 100 operate to communicate vehicle operating conditions and control signals throughout the vehicle. For example, communication module 114 may be coupled via an I/O port 118 to a headlamp switch 117. Upon operation of the headlamp switch 117, communication module 114 receives a "turn-on" or "turn-off" signal through the I/O port 118 to control the headlamps of a vehicle including the system 100. Communication module 114 encodes the headlamp signal into serial digital data. To enhance reliability of the system 100, the signal is also preferably encoded into complementary serial digital data as will be described hereinafter.

Typically a message including data to be transmitted includes an initial start-of-message code, an address which is recognizable by the appropriate receiving node, the encoded data, and finally terminated by an end-of-message code. Module 114 conveys the digital data and the complementary digital data via conductors 138 to respective input terminals INA and INB of a driver circuit 124. The driver circuit 124 transmits the serial data and the complementary digital data via output terminals OUTA and OUTB and conductors 128 and 130 to the bus lines 104 and 106, respectively. Every communication node coupled to the bus lines 104 and 106 receives the digital data and the complementary digital data. However, only the node which recognizes its own address is activated and that node appropriately controls the headlamps in response to the signal received on the I/O port 118.

Again referring to FIG. 1, the communication module 114 is coupled to information sources, such as accessory switches, automobile sensors or the like and/or to devices to be controlled such as headlamps, automobile displays or the like, by means of the I/O port 118. All of these information sources and devices to be controlled are generally represented by the switch 117. It is to be understood that the I/O port 118 typically comprises a plurality of conductors which can receive a corresponding plurality of input signals. For example, signals from an associated computer can interface with the communication module 114 at the I/O port 118. System power is supplied through a conductor 126 and defines the logic high voltage level available on the twisted wire pair 102 via a conductor 136 and a resistor 132.

Communication module 114 generates complementary output signals on the conductors 138 which are signals are passed to input terminals INA and INB of the driver circuit 124. Thus, when input terminal INA is high, input terminal INB is low and when input terminal INA is low, input terminal INB is high. The driver circuit 124 provides slew rate controlled drive to the bus line 104 via the output terminal OUTA and to the bus line 106 via the output terminal OUTB.

In response to a low to high transition of the signal on the input terminal INA, the driver circuit 124 actively pulls the bus line 104 low at a controlled slew rate. Similarly, when a high to low transition of the signal on the input terminal INB occurs, the driver circuit 124 actively pulls the bus line 106 high at a controlled slew rate.

Alternatively, when a high to low transition of the signal on the input terminal INA occurs, the driver circuit releases the bus line 104 which is then passively pulled high through the resistor 132 if no other node is pulling the bus line 104 low. When a low to high transition occurs on the input terminal INB, the driver circuit 124 releases the bus line 106 so that it can be passively pulled low by the resistor 134 if no other node is driving the bus line 106 high. Since the driver circuit 124 does not drive the bus lines 104 and 106 during passive transitions of the output terminals OUTA and OUTB, the passive transition slew rate is controlled primarily by the capacitance of the system in a manner well known in the art.

By thus controlling the state of the bus lines 104 and 106, the driver circuit 124 serially transmits information as digital data and, for reliability purposes, complementary digital data over the bus lines 104 and 106. The communication module 114 receives the digital data and the complementary digital data from the bus lines 104 and 106 via respective conductors 120 and 122.

A simplified schematic block diagram of the communication module 114 is shown in FIG. 2. A processor 214 receives signals from various sensors and signal sources within a vehicle, and transmits signals to devices within a vehicle which are to be controlled or need sensed information. Vehicle sensors and signal sources may include temperature sensors, engine sensors, specialized computers and the like throughout the vehicle, while devices to be controlled may include accessory motors, solenoids, displays and the like throughout the vehicle. Exchange of these signals with the communications modules 114 of the nodes 108 of the system 100 are through the I/O ports 118.

Any signal received by the processor 214 is encoded into digital data and complementary digital data and serially transmitted over the conductors 138 to the input terminals INA and INB of the driver circuit 124 and ultimately to the bus lines 104, 106, as shown in FIG. 1.

Digital data and complementary digital data serially transmitted over the bus lines 104 and 106 are received by the communication modules 114 of other ones of the communication nodes 108A–108X on the conductors 120 and 122. In response to detection of a start-of-message code, a receiver selector 210 examines the incoming address to determine whether the communication node including the communication module 114 is the designated recipient of the message. A fault detector 218 determines whether the message has been correctly received for example by processing a cyclic redundancy code (CRC) segment appended to the message or by other well known fault detection techniques.

If the communication module 114 is included within the designated communication node, the receiver selector 210 couples the received data to a data decoder 212 upon verification of receipt of a valid message by the fault detector 218. The data decoder 212 decodes the received data and provides the decoded data to the processor 214 which interprets instructions to thereby send out received information or control instructions over the I/O port 118. The design and operation of communication modules using complementary data in motor vehicle applications are known in the art and are described, for example, in commonly assigned U.S. Pat. No. 4,792,950 issued to Volk et al.

As previously noted, the digital data and the complementary digital data are typically incorporated into a message consisting of a start-of-message code, an address which is recognizable by the identified communication node, digital data and complementary data, and an end-of-message code. The message data consists of a plurality of bits, with each bit being divided into a plurality of subbits. The division of a bit into subbits is easily accomplished by conventional timing or clock techniques well known in the art.

FIG. 3A shows a pulse width modulated (PWM) logic one (1) bit consisting of three subbits T1, T2 and T3 in accordance with the present invention. The logic one (1) bit has the first subbit T1 at a high logic level and the second and third subbits T2 and T3 at a low logic level. Similarly, FIG. 3B shows a PWM logic zero (0) bit divided into three subbits T1, T2 and T3, with the subbits T1 and T2 at a high logic level and the subbit T3 at a low logic level. In accordance with a working embodiment of the present invention, the subbits T1, T2 and T3 comprise a total of twenty four microseconds in duration.

By increasing the duration of the subbit T3, the passive edge of a logic zero (0) bit is more reliably detected. The passive edge decreases over a time period determined by the system capacitance. Therefore, increasing the duration of the subbit T3 provides more time for the passive edge to decrease to a level sufficient for detection by a communication module 114 receiving the signal. Increased data bit rates can thus be obtained while maintaining system reliability. Further, the increased duration of the subbit T3 provides additional time to compensate for component activation delays and reduces the effects of EMI and inherent capacitance in the system for high data transmission rates.

Preferably, each successive subbit T1, T2 and T3 is of a longer duration than the preceding subbit. For example, the subbit T1 may be seven microseconds, the subbit T2 may be eight microseconds and the subbit T3 may be nine microseconds. By utilizing the disclosed pulse width timing technique data transfer rates of 41.667 kilobits per second have been obtained with up to thirty two nodes on the data bus. Thus, the present invention provides a pulse width modulation bit encoding scheme which allows increased data transmission rates.

Having thus described the method and apparatus for communicating pulse width modulated data in the multiplex wiring system of the present invention in detail and by reference to preferred embodiments thereof, it will be apparent that modifications and variations are possible without departing from the scope of the invention defined in the appended claims.

What is claimed is:

1. A method for serially communicating data over a data bus coupled to at least first and second communication nodes said method comprising the steps of:
   receiving a signal in said first communication node, said signal being representative of operations associated with said first communication node;
   encoding said signal as digital data comprising a plurality of bits, each of said bits comprising a plurality of subbits of unequal duration with each of the corresponding subbits for all of said bits having equal duration;
   transmitting said digital data serially over said data bus;
   receiving said digital data in said second communication node; and
   decoding said digital data.

2. A method for serially communicating data as claimed in claim 1 further comprising the step of progressively increasing the duration of each succeeding subbit of said plurality of subbits of each of said bits of said digital data.

3. A method for serially communicating data as claimed in claim 2 wherein each of said bits of said digital data has a duration of twenty four microseconds and comprises three subbits, and the step of progressively increasing the duration of each succeeding subbit of said plurality of subbits comprises the steps of:
   making each first subbit equal to seven microseconds;
   making each second subbit equal to eight microseconds; and
   making each third subbit equal to nine microseconds.

4. A method for serially communicating data as claimed in claim 3 wherein the step of transmitting said digital data is performed at a frequency of 41.667 kilobits per second.

5. A method for serially communicating data as claimed in claim 1 further comprising the steps of:
   encoding complementary digital data for transmission over said data bus, said complementary digital data being the complement of said digital data and comprising a plurality of bits each of which comprises a plurality of subbits of unequal duration with each of the corresponding subbits for all of said bits having equal duration;
   transmitting said complementary digital data serially on said digital data bus;
   receiving said complementary data in said second communication node; and
   decoding said complementary digital data.

6. A method for serially communicating data as claimed in claim 5 further comprising the step of progressively increasing the duration of each succeeding subbit of said plurality of subbits of each of said bits of said digital data and said complementary digital data.

7. A method for serially communicating data as claimed in claim 6 wherein each of said bits of said digital data and said complementary digital data has a duration of twenty four microseconds and comprises three subbits, and the step of progressively increasing the duration of each succeeding subbit of said plurality of subbits comprises the steps of:
   making each first subbit equal to seven microseconds;
   making each second subbit equal to eight microseconds; and
   making each third subbit equal to nine microseconds.

8. A method for serially communicating data as claimed in claim 7 wherein the steps of transmitting said digital data and transmitting said complementary digital data are performed at a frequency of 41.667 kilobits per second.

9. A method for serially communicating data on a twisted wire pair routed throughout a motor vehicle, said twisted wire pair being coupled to a plurality of communication nodes, said method comprising the steps of:

receiving signals representative of conditions of said motor vehicle in one of said plurality of communication nodes;

encoding said signals within said one of said plurality of communication nodes into digital data, said digital data comprising a plurality of bits, each of said bits containing first, second and third subbits of seven, eight and nine microseconds duration, respectively;

transmitting said digital data on said twisted wire pair;

receiving said digital data in remaining ones of said plurality of communication nodes; and decoding said digital data.

10. A multiplex wiring system for a motor vehicle comprising:

a plurality of communications nodes;

a data bus interconnecting said plurality of communications nodes for serial data transmission;

each of said communications nodes comprising:

first receiver means for receiving signals representative of conditions of said motor vehicle;

encoder means for encoding said signals into digital data, said digital data comprising a plurality of bits, each of said bits comprising a plurality of subbits of unequal duration with each of the corresponding subbits for all of said bits having equal duration;

transmitter means for transmitting said digital data on said data bus;

second receiver means for receiving digital data from remaining ones of said plurality of communication nodes; and decoder means for decoding said digital data.

11. A multiplex wiring system for a motor vehicle as claimed in claim 10 wherein said encoder means further provides for encoding complementary digital data for transmission over said data bus, said complementary digital data being the complement of said digital data and comprising a plurality of bits each of which comprises a plurality of subbits of unequal duration with each of the corresponding subbits for all of said bits having equal duration, and said transmitter means further provides for transmitting said complementary digital data on said data bus.

12. A multiplex wiring system for a motor vehicle as claimed in claim 11 wherein said decoder means further provides for decoding said encoded complementary digital data.

13. A multiplex wiring system for a motor vehicle as claimed in claim 12 wherein each of said plurality of bits comprises a first subbit of seven microsecond duration, a second subbit of eight microsecond duration and a third subbit of nine microsecond duration.

14. A multiplex wiring system for a motor vehicle as claimed in claim 13 wherein said data bus is a twisted wire pair.

15. A multiplex wiring system for a motor vehicle as claimed in claim 14 wherein said digital data and said complementary digital data are transmitted at 41.667 kilobytes per second.

* * * * *